US005890385A

United States Patent [19]

Lee

[11] Patent Number: 5,890,385

[45] Date of Patent: Apr. 6, 1999

[54] SAFETY DOOR LOCK

[76] Inventor: Ming-Kun Lee, 2/F., No. 13, Hsing-Nan St., Nan-Kang Dist., Taipei City, Taiwan

[21] Appl. No.: 22,479

[22] Filed: Feb. 12, 1998

[51] Int. Cl.$^{6}$ .................................................... C05B 55/04

[52] U.S. Cl. ................................ 70/472; 70/149; 70/218; 70/422; 292/167; 292/139; 292/336.3; 292/DIG. 27

[58] Field of Search ............................. 70/222, 223, 467, 70/468, 472, 473, 486, 149, 150, 422, 218; 292/165, 167, 173, 139, 143, 336.3, DIG. 27

[56] References Cited

U.S. PATENT DOCUMENTS 563,867 7/1896 Moser ...................................... 70/486
3,375,687 4/1968 Foster ...................................... 292/165
3,750,433 8/1973 Sanders .................................. 292/165
3,808,849 5/1974 Alexander ................................ 70/149
4,589,691 5/1986 Foshee et al. .................. 292/DIG. 61

*Primary Examiner*—Steven Meyers
*Assistant Examiner*—Teri Pham
*Attorney, Agent, or Firm*—Rosenberg, Klein & Belker

[57] ABSTRACT

A safety door lock comprises follower member turned with an inside door knob or an outside door knob to move a latch bolt between the locking position and the unlocking position, and a clutch controlled by a push block between a first position where the outside door knob is coupled to the follower member and a second position where the outside door knob is disconnected from the follower member.

1 Claim, 5 Drawing Sheets

SAFETY DOOR LOCK

BACKGROUND OF THE INVENTION

The present invention relates to door locks, and more particularly to a safety door lock which can be controlled to enable the outside door knob to run idle.

FIG. 5 shows a door panel equipped with a door lock. The door lock comprises a latch bolt 51, a door knob assembly 5 for turning with the hand to move the latch bolt 51 in and out of the casing of the door lock, a dead bolt 53 which can be turned only with the key when from the outside, and a knob 52 provided at an inner side of the door panel for turning the dead bolt 53 with the hand indoors. FIG. 6 shows a door panel equipped with another structure of door lock, in which the lock cylinder 6 must be turned with the key either indoors or outdoors to move the dead bolt between the locking position or the unlocking position. FIG. 7 shows a door panel equipped with two different door locks, in which the first lock comprises a dead bolt turned between the locking position and the unlocking position with the key from the outside or the knob 71 from the inside, and a latch bolt turned with a door knob assembly 7; the second door lock 72 can only be unlocked with the key when from the outside.

SUMMARY OF THE INVENTION

The present invention provides a safety door lock which can be conveniently controlled to enable the outside door knob to run idle. According to the present invention, the safety door lock comprises a follower member turned with an inside door knob or an outside door knob to move a latch bolt between the locking position and the unlocking position, and clutch means controlled by a push block between a first position where the outside door knob is coupled to the follower member and a second position where the outside door knob is disconnected from the follower member.

DETAILED DESCRIPTION OF THE PREFERRED EMBODIMENT

Figure 1:
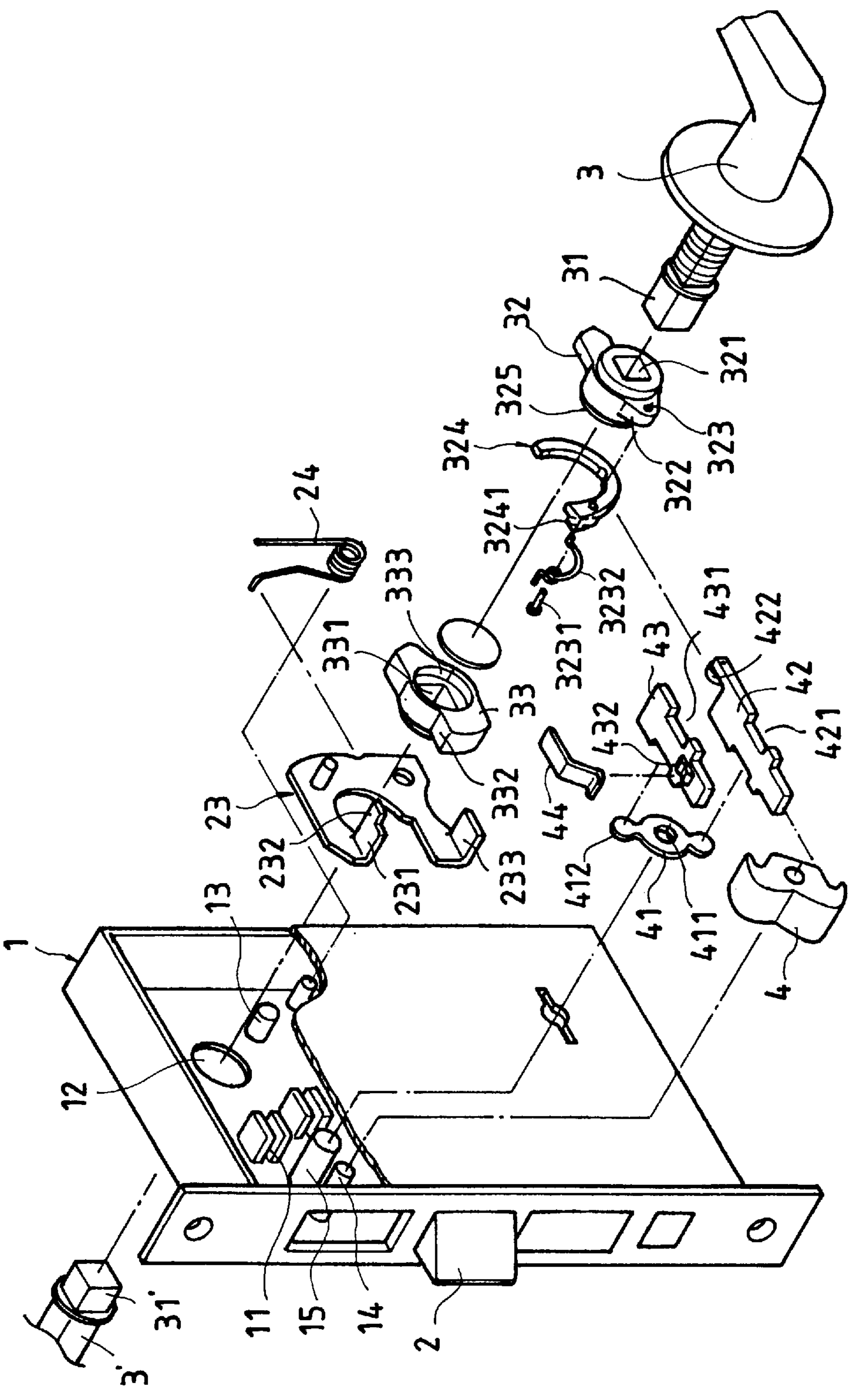
FIG. 1 is an exploded view of a safety door lock according to the present invention.
Figure 3:
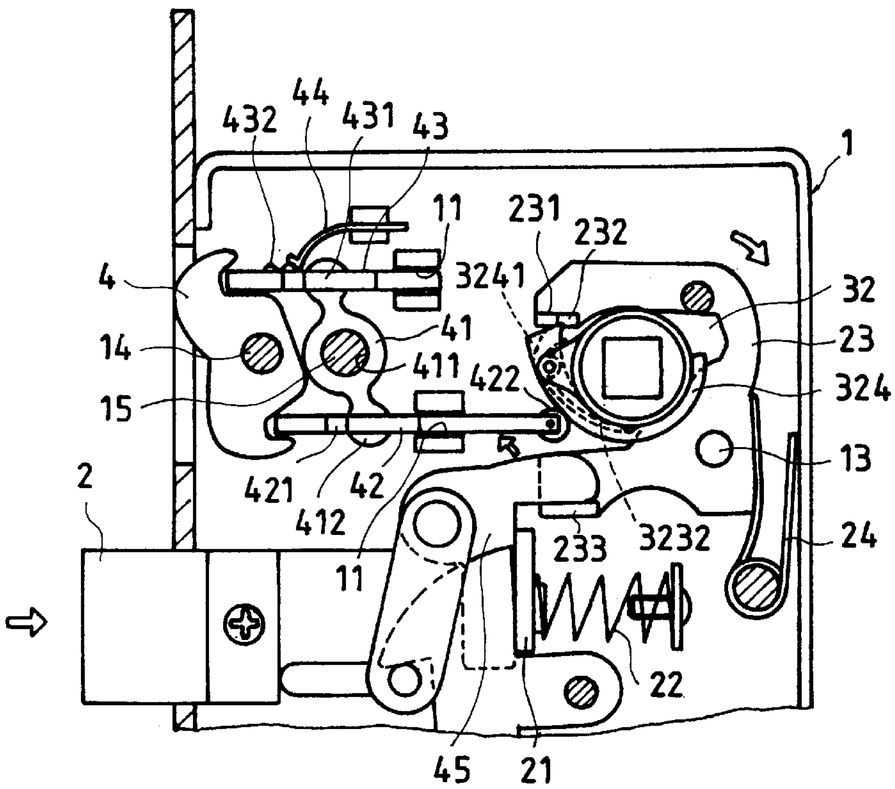
FIG. 3 is similar to FIG. 2 but showing the first slide moved inwards and pressed against the clutch member, the clutch member coupled to the follower member.
Figure 2:
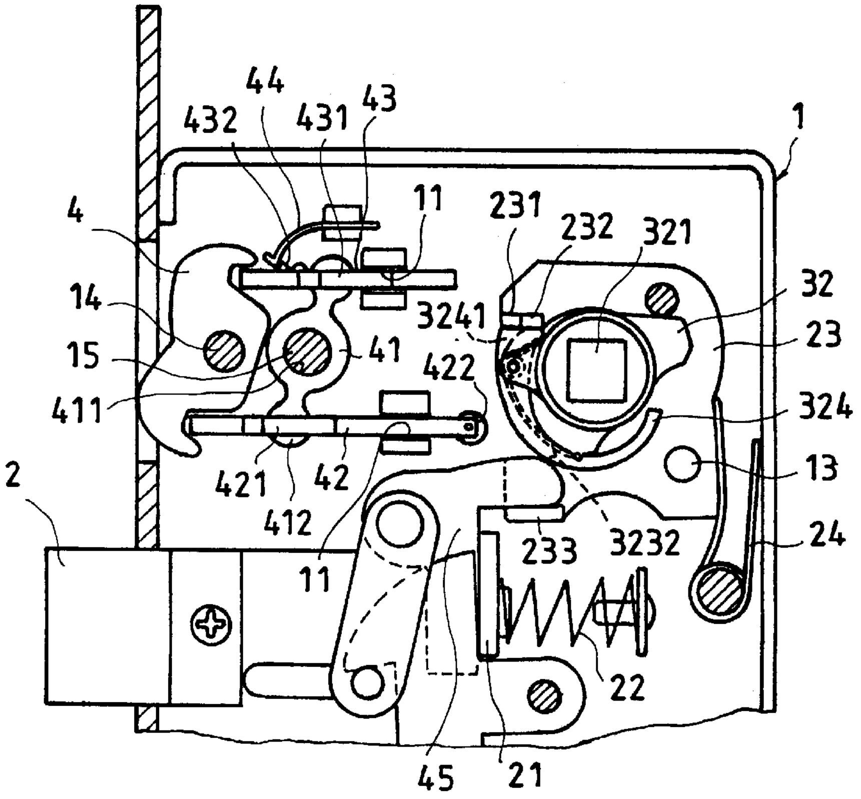
FIG. 2 is a sectional assembly view of the safety door lock shown in FIG. 1.
Figure 4:
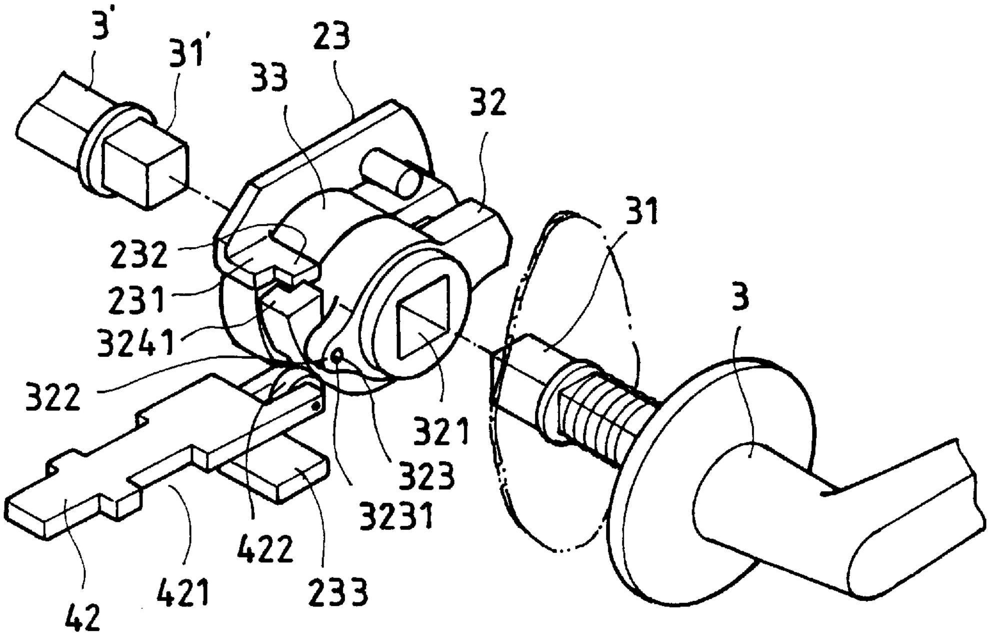
FIG. 4 is a perspective assembly view of a part of the present invention.
Figure 5:
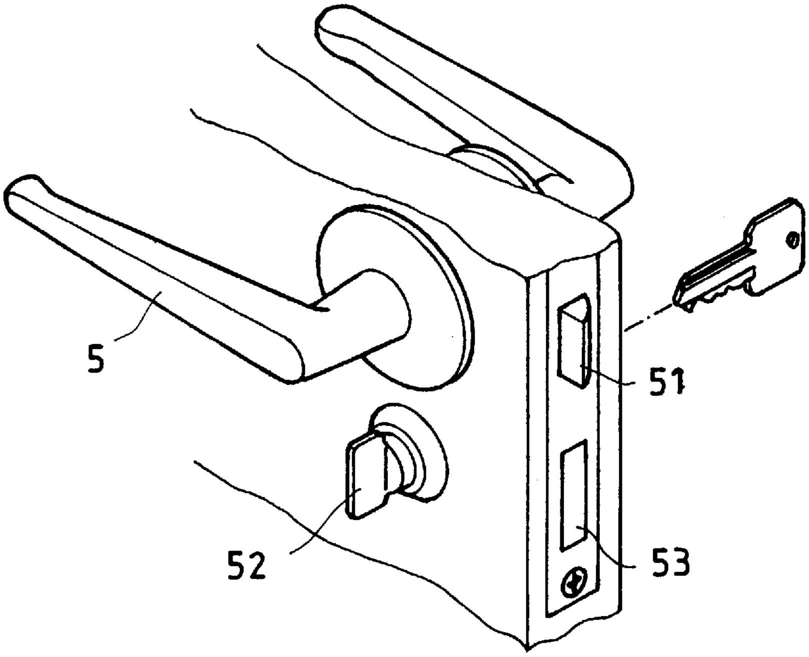
FIG.5 PRIOR ART
FIG. 5 shows a door panel installed with a door lock according to the prior art.
Figure 6:
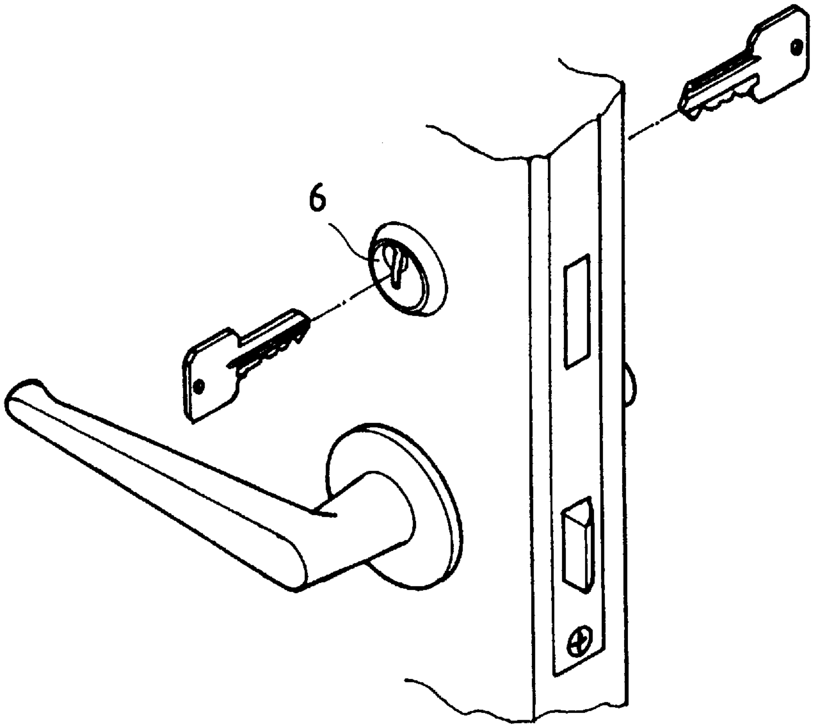
FIG.6 PRIOR ART
FIG. 6 shows a door panel installed with another structure of door lock according to the prior art.
Figure 7:
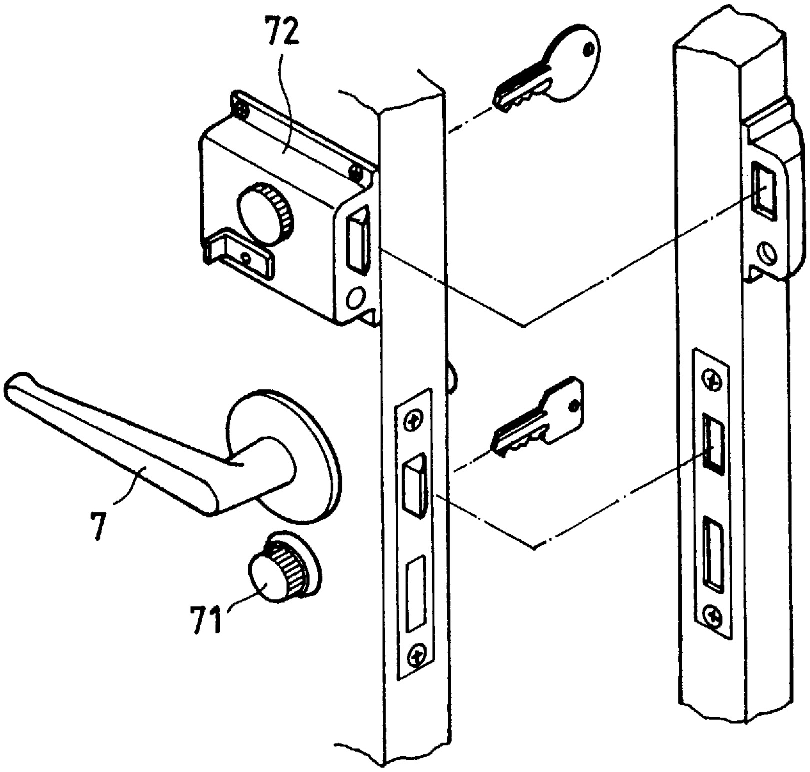
FIG.7 PRIOR ART
FIG. 7 shows door panel installed with two different door locks according to the prior art.

Referring to FIGS. 1, 2 and 3, when the outside door knob, referenced by 3, is turned with the hand, it runs idle, and the follower member, referenced by 23, is not driven to push a swivel member 45 in opening the latch bolt, referenced by 2. The follower member 23 is turned about a pivot 13 inside a casing 1. A first control member 32 and a second control member 33 are provided. The first control member 32 has a circular coupling flange 325 at its rear side coupled to a circular coupling hole 333 at the rear side of the second control member 33, a square center hole 321 coupled to the square shaft 31 of the outside door knob 3, and a lug 322 with a pin hole 323 at one lateral side. When coupled, the first control member 32 can be rotated in the coupling hole 333 on the second control member 33. The second control member 33 has a square center hole 331 coupled to the square shaft 31' of the inside door knob, referenced by 3'. A smoothly arched clutch member 324 is pivoted to the pivot hole 323 on the lug 322 of the first control member 32 by a pivot pin 3231, having a triangle push portion 3241. A spring 3232 is provided to impart a pressure to the clutch member 324, causing the triangle push portion 3241 of the clutch member 324 to be forced away from a bearing portion 232 on a projecting strip 231 of the follower member 23. The second control member 33 further comprises a push flange 332 stopped at the projecting strip 231 of the follower member 23. A first post 14 and a second post 15 are provided at the casing 1. A push block 4 which has both ends hooked is turned about the first post 14. A coupling member 41 is pivoted to the second post 15, having a center axle hole 411 which receives the second post 15 and two opposite push ends 412. A first slide 42 and a second slide 43 are respectively coupled to the hooked ends of the push block 4 and arranged in parallel, having a respective side notch 421;431. The two push ends 412 of the coupling member 41 are respectively inserted into the side notches 421;431 on the slides 42;43. The first slide 42 has one end mounted with a pulley 422. When one end of the push block 4 is pressed with the hand, the first slide 42 is moved inwards to force the pulley 422 against the triangle push portion 3241, causing the clutch member 324 to move the triangle push portion 3241 away from the bearing portion 232 of the projecting strip 231 of the follower member 23, and therefore turning the outside door knob 3 with the hand does not move the follower member 23. Further, the second slide 43 has a locating portion 432. A spring plate 44 is mounted inside the casing 1, having one end stopped at the locating portion 432 of the second slide 43. The spring plate 44 imparts a pressure to the second slide 43 against the push block 4. Further, the follower member 23 has a coupling strip 233 coupled to the swivel member 45. The swivel member 45 is supported on a push plate 21, which is forced forwards by a spring 22.

As indicated above, by means of pushing the two opposite ends of the push block 4 alternatively, the clutch member 324 is controlled to transmit the rotary driving force from the outside door knob 3 to the follower member 23 or to stop its transmission.

While only one embodiment of the present invention has been shown and described, it will be understood that various modifications and changes could be made thereunto without departing from the spirit and scope of the invention disclosed.

What the invention claimed is:

1. A safety door lock comprising a casing mounted on a door panel, a striking plate mounted on a door frame, a latch bolt supported on a spring inside said casing and driven to extend out of a hole on said casing into a hole on the striking plate, a follower member coupled to said latch bolt and turned about a pivot inside said casing to move said latch bolt in and out of said casing, an outside door knob mounted in a hole on said casing at an outer side, a first control member turned with said outside door knob, an inside door knob mounted in a hole on said casing at an inner side, a second control member mounted on said inside door knob and coupled to said follower member, said second control member being turned with said inside door knob to drive said follower member in moving said latch bolt in and out of said casing, wherein a clutch mechanism is provided inside said casing and controlled to couple said first control member to said follower member, permitting said follower member to be turned with said first control member and said outside door knob to move said latch bolt in and out of said casing, said clutch mechanism comprising a smoothly arched clutch member pivoted to a side lug of said first control member by a pivot, said smoothly arched clutch member having a triangle push portion, spring means mounted inside casing and imparting a pressure to said smoothly arched clutch member to move said smoothly arched clutch member away from said follower member, a push block turned about a post inside said casing adjacent to one side hole on said casing, said push block having a first hooked portion and a second hooked portion respectively disposed at two opposite ends thereof, a first slide and a second slide moved horizontally inside said casing at different elevations and respectively coupled to the two hooked portions of said push block, a coupling member turned about a post inside said casing, said coupling member having two opposite ends respectively coupled to said first slide and said second slide for permitting first slide and said second slide to be moved with said push block in reversed directions, a spring plate mounted inside said casing and stopped at a locating portion on said second slide to push said slide against said push block, said push block being moved between a first position where said first slide is moved inwards and pressed against said clutch member, causing the triangle push portion of said clutch member to be forced into contact with said follower member for permitting said follower member to be turned with said outer doorknob, and a second position where said second slide is pushed inwards and said first slide is pushed outwards and disengaged from said clutch member.

* * * * *